United States Patent
Zils (12)

(10) Patent No.: US 6,293,187 B1
(45) Date of Patent: Sep. 25, 2001

(54) MILK FROTHING DEVICE

(75) Inventor: Jürgen W. Zils, Kronberg (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/564,969

(22) Filed: May 4, 2000

(30) Foreign Application Priority Data

May 8, 1999 (DE) .............................. 199 21 483

(51) Int. Cl.[7] .............................. A23L 2/54; B01D 47/02
(52) U.S. Cl. .................. 99/323.1; 99/293; 267/DIG. 16; 267/DIG. 76; 267/121.1
(58) Field of Search ............................. 99/275, 293, 294, 99/323.1, 323.2; 261/123, 126, 121.1, DIG. 16, DIG. 76

(56) References Cited

U.S. PATENT DOCUMENTS 4,342,710 * 8/1982 Adolfsson et al. ............. 99/323.1 X
5,638,740 * 6/1997 Cai ...................................... 99/293 X
5,931,080 * 8/1999 Roure Boada ......................... 99/293

FOREIGN PATENT DOCUMENTS 29810291 10/1998 (DE) .

* cited by examiner

Primary Examiner—Reginald L. Alexander
(74) Attorney, Agent, or Firm—Fish & Richardson, P.C.

(57) ABSTRACT

The present invention relates to a milk frothing device with a steam pipe that extends through a base member and has at its end a nozzle, and with a container that can be placed underneath the nozzle. The base member along with the steam pipe and the nozzle is vertically displaceable within a longitudinal guide of a housing of the device. This permits immersing the nozzle into the container and frothing the milk disposed therein without needing the hand of a user to hold the container. This arrangement prevents scalds and improves ease of handling.

10 Claims, 3 Drawing Sheets

MILK FROTHING DEVICE

BACKGROUND

The present invention relates to a milk frothing device with a steam pipe that extends through a base member and has at its end a nozzle with a jet orifice and with a container including a bottom that can be placed underneath the nozzle.

Milk frothing devices of this type represent the state of the art in up-to-date espresso-cappuccino makers and are used to froth up milk that was filled into a container.

In coffee or espresso makers with a spout arrangement from which the coffee brew is discharged, vertically adjustable spout arrangements or cup lifts have already become known which permit adjusting the distance in height between a spout member of the spout arrangement and a container in order to adapt to differently high drip containers, such as espresso cups (see e.g. DE 298 10 291 U1). A vertically adjustable coffee outlet of such a type will not optimize the preparation of coffee per se, but only reduce the splashes which may be caused in the event of a too great drop height of the coffee which is discharged into the drip container and, especially, the espresso cup.

An object of the present invention is to provide a generic milk frothing device which renders it possible to easily immerse the nozzle into a container filled with milk, on the one hand. Another objective is that the container need not be held in the hand of a user during the frothing operation, that means, while hot steam is forced through the milk. In addition, a particularly good frothing result shall be achieved in a shortest possible time.

SUMMARY OF THE INVENTION

According to the present invention, this object is achieved by a milk frothing device with a steam pipe that extends through a base member and has at its end a nozzle with a jet orifice, the steam pipe being connected with a steam generator by way of a conduit, and with a container including a bottom that can be placed underneath the nozzle. The milk frothing device is characterized in that the base member with the steam pipe and the nozzle is vertically displaceable within a longitudinal guide of a housing of the device, and in that the portion of the conduit that is provided between the base member and the steam generator has a flexible design. It became possible for the first time to achieve an adjustability of height for a cappuccino nozzle, which is sufficient for containers of conventional use. In this arrangement, it is not necessary to hold the container in one's hand during frothing, and the steam pipe with the nozzle may easily be immersed from the top into the container due to its vertical displaceability. It is favorable that the portion of the conduit which is disposed between the base member and the steam generating means is at least partly flexible to permit height adjustment.

According to certain features of the invention, the distance of the nozzle from the bottom of a container of any type, especially bottoms of different levels, can be optimized by means of a range spacer which projects downwardly from the jet orifice.

The vertical displacement of the base member with the steam pipe in the longitudinal guide can be infinitely variable or can be realized in small steps. The guide arrangement is so configured that the milk frothing nozzle is immersed in a suitable way, which is generally vertical, into a container until it reaches a sufficient depth, and is placed in a defined end position in which the free end of the range spacer will abut on the bottom of the container.

The vertical movement of the base member in an upward direction may be effected manually, for example, and the vertical downward movement into the milk container may take place automatically. This is a first step to a fully automatic milk frothing operation where both the upward and the downward movement of the base member with the nozzle attached to the steam pipe could be performed automatically.

The orifice is covered by a shield during the displacement of the base member according to another feature of the invention.

Ease of replacement and attachment of further design forms of nozzle members is rendered possible by other features of the invention in which the nozzle along with the range spacer forms a nozzle member and the nozzle member is attached to the steam pipe in an exchangeable fashion.

It is self-explanatory that the milk frothing device of the present invention can be used along with all coffee and espresso makers and also as an independent device which may be operated independently of a cappuccino or coffee maker.

One preferred embodiment of the milk frothing device according to the present invention will be described in detail hereinbelow by making reference to the accompanying drawings.

DETAILED DESCRIPTION

Figure 1:
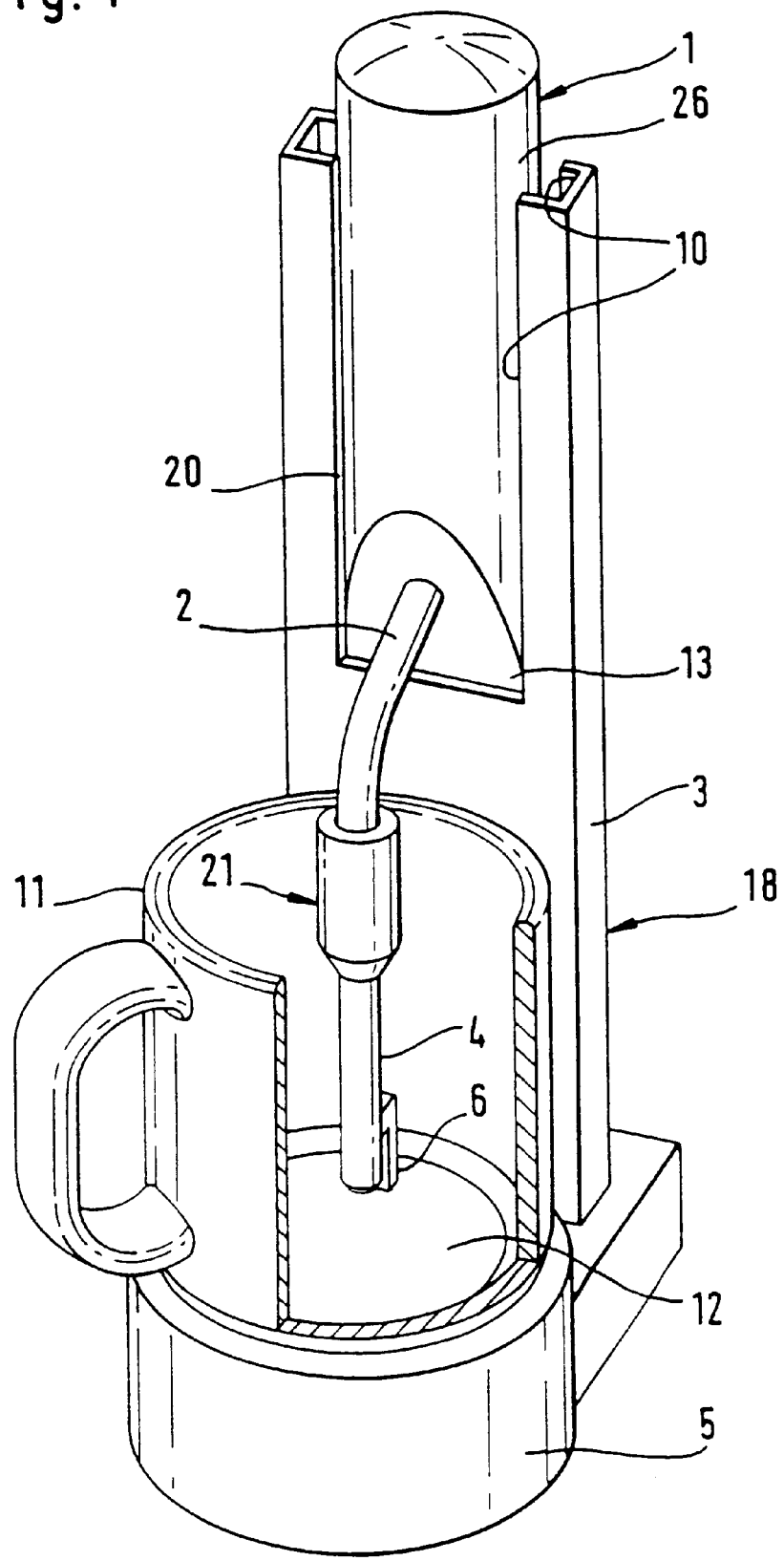
FIG. 1 is a perspective partial view of a milk frothing device in which the basic parts are illustrated, and in which the side wall of the container has been cut open in order to make the nozzle visible which is optimally spaced from the container's bottom.
Figure 2:
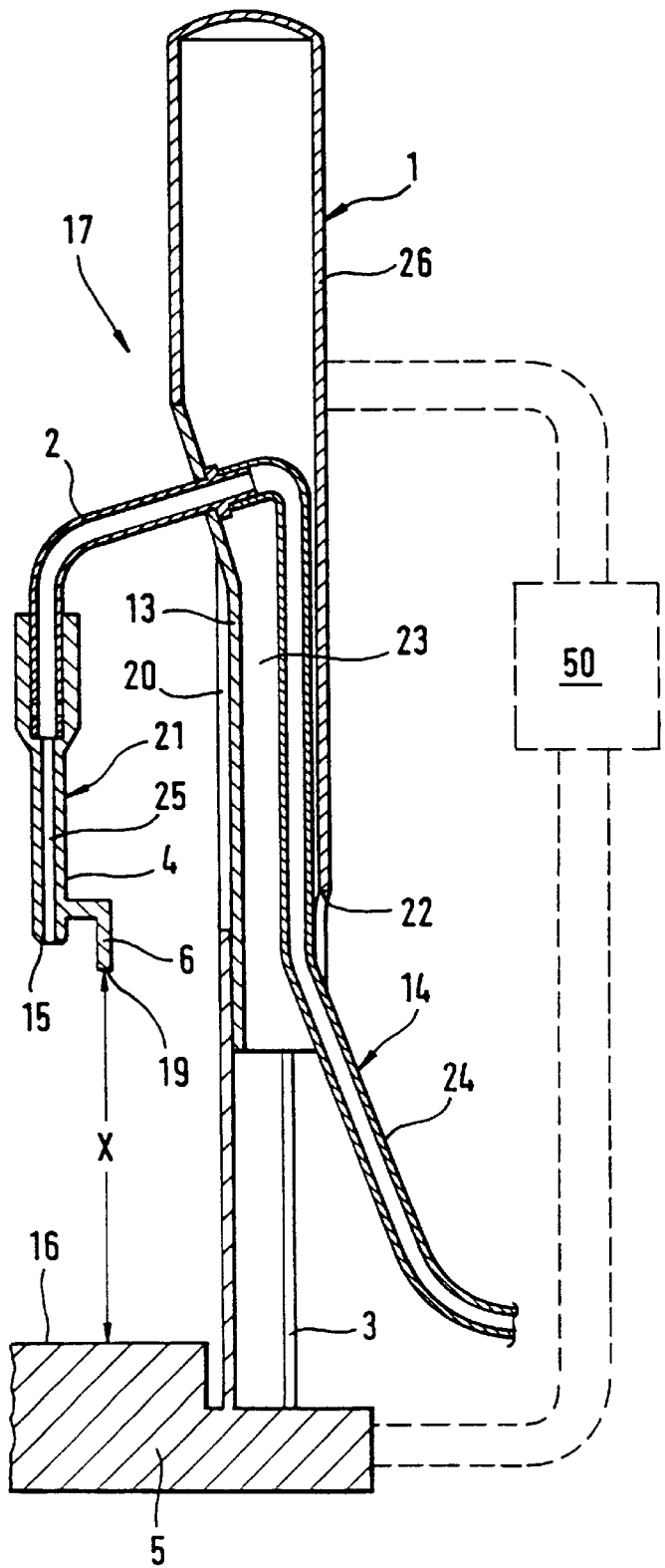
FIG. 2 is a cross-sectional view of the top position of the base member of the milk frothing device of the present invention which is adjustable in the longitudinal guide.
Figure 3:
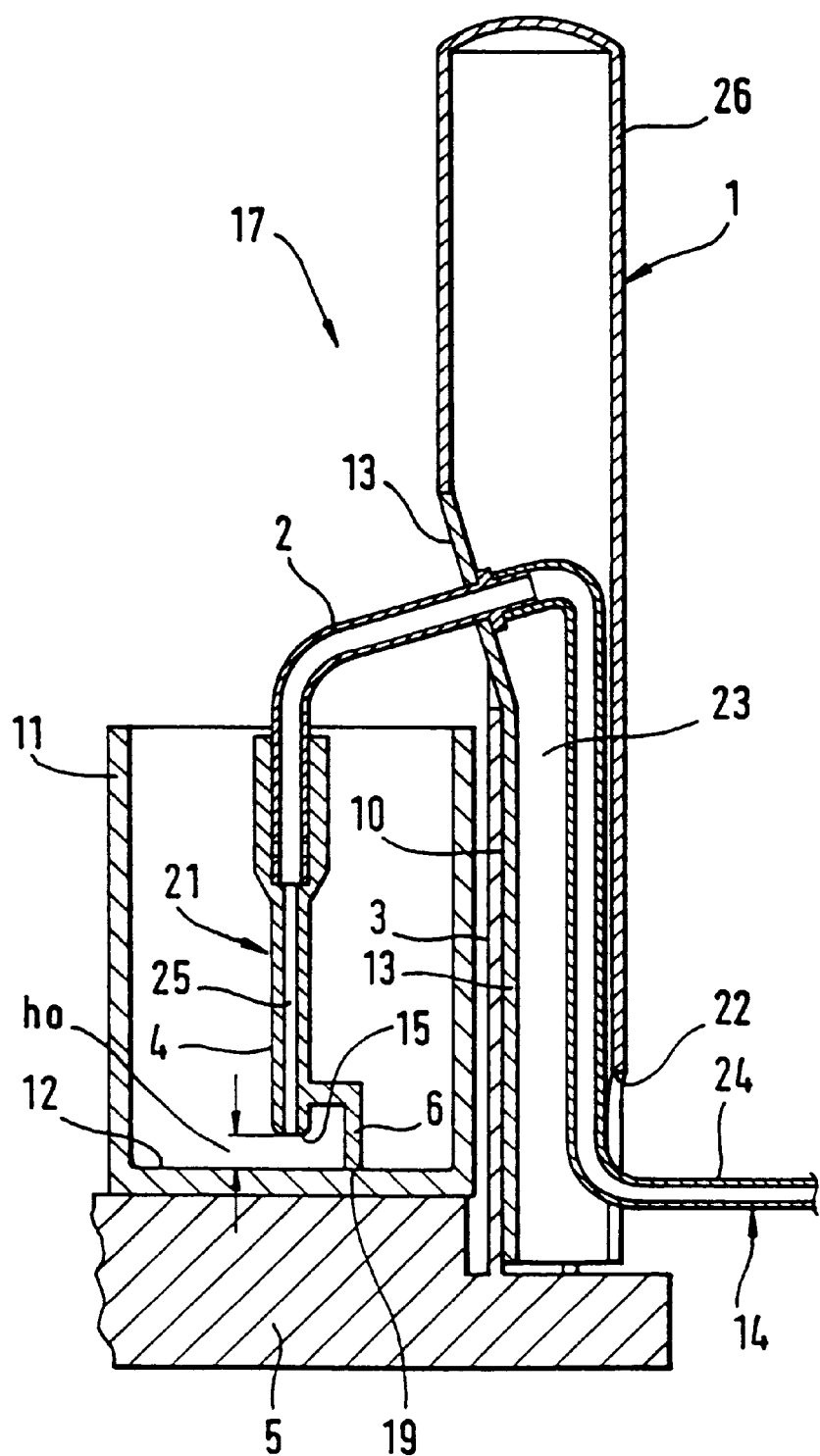
FIG. 3 is similar to FIG. 2, however, the nozzle is immersed into a container in this case and, thus, exhibits its lowest position.

In the embodiments of a milk frothing device 17 of the present invention shown in FIGS. 1 to 3, a base member 1 through which a steam pipe 2 extends is vertically displaceable by a maximum distance in a pillarlike part 3 of the housing body 18 of the device which includes a longitudinal guide 10. The said maximum distance is indicated by the dimension X in FIG. 2. The purpose of the vertical displaceability of the base member 1 is to easily immerse the end portion of the steam pipe 2 that is provided with a nozzle 4 from above into a container 11 which, for example, is given the shape of a cylindrical cup with a flat bottom 12 in FIGS. 1 and 3. It is not necessary to hold the container 11 in one's hand while frothing the milk it contains. Instead, container 11 is advantageously set down on a rest surface 16 of a base-type bottom part 5 of the housing of the device. This basetype bottom part 5 may also be omitted, and the container 11 is then placed directly on a support, for example, a table.

On the front part of the nozzle 4, i.e., in the area of the jet orifice 15, a range spacer 6 projects forwardly beyond the jet orifice 15 in the extension of the nozzle. The said range spacer 6 permits adjusting an optimal distance (ho) from the bottom 12 of the milk container 11 which is suitable to achieve an optimal milk frothing result, as is shown in FIG. 3. In this arrangement, the free end of the range spacer 6, that is the abutment surface 19, abuts on bottom 12 of container 11. Instead of the cylindrical bowl 11 with a flat bottom 12 shown in FIG. 1, it is of course also possible to use a bowl with a bottom which has a slightly conical or any other type of shape. Instead of being flat, the bowl bottom 12 may be slightly curved or elevated. The base member 1 and the steam pipe 2 which extends through it and is stationarily supported or attached in the base member 1 can be displaced in the longitudinal guide 10 either in an infinitely variable manner or also in small steps. The longitudinal guide 10 is so configured that the jet orifice 15 of the frothing nozzle 4 can take an appropriate way of immersion into the container 11 until the depth sufficient for the optimal milk frothing result is reached (dimension ho), and can be set in the defined end position. The base member 1 is so configured that it can cover in every position an opening 20 in the housing by means of a shield 13 or an orifice plate in order to thereby safeguard protection of the user and the device.

Although it is not shown in FIGS. 1 to 3, the longitudinal guide 10 may also be arranged such that the base member 1 and the steam pipe 2 which extends through it can be displaced not exactly vertically but with a slight inclination. Further, although illustrated only diagrammatically by means 50, driving motion the vertical adjustment of the base member 1 with the steam pipe 2 extending through it is effected. The intended movement can either be carried out completely manually, or lifting only can be effected manually, and lowering the base member 1 takes place automatically. In addition, either lifting or lowering the base member 1 may be performed automatically as an alternative. Driving mechanism 50 such as a spring mechanism, a pneumatic or hydraulic or also an electromechanic drive which are needed for this purpose may easily be drafted and realized by any expert in the art.

The dimension X in FIG. 2 indicates the difference in height which is produced between the top position illustrated in FIG. 2 and the bottom position illustrated in FIG. 3.

Also, it becomes apparent from FIGS. 2 and 3 that the nozzle 4 with the range spacer 6 forms a preferably integral nozzle member 21 and that this nozzle member 21 is slipped on the foremost part of the steam pipe 2 in an exchangeable fashion. To permit vertical displacement of the base member 1 in the longitudinal guide 10 (dovetail guide or similar guide arrangements), the conduit 14 leading to the steam pipe 2 has a flexible design in the portion 24 where, according to FIGS. 2 and 3, it enters from the right through the opening 22 into the hollow space 23 of the base member 1 so that it allows being easily bent from the position shown in FIG. 2 into the position shown in FIG. 3, and vice-versa, thereby rendering possible to lift or lower the base member 1.

In the milk frothing device 17 according to the present invention, the nozzle member 21 can be immersed easily into a container 11 filled with milk by way of handle 26, because the base member 1 with the steam pipe 2 which extends through it can be moved within the longitudinal guide 10 into a top position (see FIG. 2). Afterwards, the base member 1 along with the nozzle member 21 and the nozzle 4 with the range spacer 6 attached to its front end can easily be moved by way of handle 26 to adopt the bottom position shown in FIG. 3. The range spacer 6 indicates the position which is appropriate for an optimal milk frothing result by its abutment surface 19 abutting on the bottom 12 of the container 11.

During the subsequent frothing operation where hot steam, which is produced by a steam generator that is not illustrated in the drawing, is forced through the bore 25 of nozzle member 21 into the milk, it is not necessary to hold the container 11 in one's hand. This prevents that painful splashes of hot milk will hit the skin of the hand of any user. Owing to the exchangeable design of the nozzle member 21 in which nozzle member 4 and range spacer 6 are combined, the nozzle distance ho may be varied by using a range spacer 6 of different dimensions in case of need.

What is claimed is:

1. A milk frothing device comprising:
   a housing having a longitudinal guide;
   a base member having a steam pipe extending therethrough, one end of the steam pipe having a nozzle with a jet orifice, the base member along with the steam pipe and the nozzle being vertically displaceable in the longitudinal guide;
   a steam generator; and
   a conduit having a flexible portion, the conduit connecting the steam generator to the steam pipe, the flexible portion of the conduit being provided between the base member and the steam generator.

2. The milk frothing device of claim 1, wherein the nozzle comprises a range spacer that projects downwards beyond the jet orifice, the range spacer including an abutment surface for permitting adjustment of an optimal distance of the jet orifice from a bottom surface of a milk container.

3. The milk frothing device of claim 2, further comprising a rest surface for receiving the milk container, a maximum dimension between the abutment surface of the range spacer and the rest surface being sufficiently sized to allow receipt of the milk container underneath the nozzle.

4. The milk frothing device of claim 1, wherein the vertical displacement of the base member in the longitudinal guide is continuously variable.

5. The milk frothing device of claim 1, further comprising a handle for manual displacement of the base member in the longitudinal guide.

6. The milk frothing device of claim 2, further comprising a handle for manually lifting and a means for automatically lowering the base member in the longitudinal guide until the optimal distance is reached.

7. The milk frothing device of claim 1, further comprising a means for automatically lifting and automatically lowering the base member in the longitudinal guide.

8. The milk frothing device of claim 1, wherein the base member further includes a shield for covering openings in the housing in every vertical displacement position of the base member.

9. The milk frothing device of claim 2, wherein the nozzle and the range spacer together form a nozzle member.

10. The milk frothing device of claim 9, wherein the nozzle member is exchangably attached to the steam pipe.

* * * * *